United States Patent
Altmann et al.

(10) Patent No.: US 8,459,424 B2
(45) Date of Patent: Jun. 11, 2013

(54) FREEWHEEL CLUTCH

(75) Inventors: Frieder Altmann, Pommersfelden (DE); Swen Doerrie, Herzogenaurach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 99 days.

(21) Appl. No.: 13/256,266

(22) PCT Filed: Apr. 21, 2010

(86) PCT No.: PCT/EP2010/055272
§ 371 (c)(1),
(2), (4) Date: Sep. 13, 2011

(87) PCT Pub. No.: WO2010/122058
PCT Pub. Date: Oct. 28, 2010

(65) Prior Publication Data
US 2012/0000741 A1    Jan. 5, 2012

(30) Foreign Application Priority Data

Apr. 25, 2009   (DE) .................. 10 2009 018 965

(51) Int. Cl.
*F16D 41/067*    (2006.01)
(52) U.S. Cl.
USPC .................................... 192/45.016
(58) Field of Classification Search
USPC ............ 192/45.001, 45.004, 45.006, 45.008, 192/45.013, 45.015, 45.016; 188/82.84
See application file for complete search history.

(56) References Cited

U.S. PATENT DOCUMENTS

| 2,843,238 | A | * | 7/1958 | Rozner | 192/45.016 |
| 3,031,053 | A |   | 4/1962 | Sauzedde et al. | |
| 3,737,015 | A | * | 6/1973 | Johnson et al. | 192/45.019 |
| 3,902,580 | A |   | 9/1975 | Johnson | |
| 3,955,659 | A | * | 5/1976 | Ehret et al. | 192/45.016 |
| 4,054,192 | A |   | 10/1977 | Johnson | |
| 4,555,002 | A | * | 11/1985 | Baker | 192/45.014 |
| 4,850,462 | A | * | 7/1989 | Lederman | 192/45.016 |
| 5,603,394 | A |   | 2/1997 | Joppeck | |
| 5,669,476 | A |   | 9/1997 | Lederman | |

FOREIGN PATENT DOCUMENTS

DE    10 2005 056 220 A1    6/2007

* cited by examiner

*Primary Examiner* — Richard M. Lorence
(74) *Attorney, Agent, or Firm* — Lucas & Mercanti, LLP

(57) ABSTRACT

A freewheel clutch which has rollers arranged between an inner and outer ring. One of the rings has ramps that interact with the rollers. Each roller is spring-loaded against a ramp by a leaf spring. Each spring is held on a web of a cage by a U-shaped section that encompasses the web. The spring has a securing section connected to the U-shaped section that extends tangentially, limits mobility of a roller in a first radial direction, and is connected to a U-bottom of the U-shaped section. An end section of a U-leg facing away from the U-bottom is bent from the U-leg, forming a second securing section, which limits mobility of the roller in the second radial direction. An extension of the end section facing the U-bottom engages the web such that the spring is held on the web radially by the U-bottom and extension of the end section.

7 Claims, 2 Drawing Sheets

FREEWHEEL CLUTCH

CROSS-REFERENCE TO RELATED APPLICATIONS

This application is a 371 of PCT/EP2010/055272 filed Apr. 21, 2010, which in turn claims the priority of DE 10 2009 018 965.3 filed Apr. 25, 2009. The priority of both applications is hereby claimed and both applications are incorporated by reference herein.

FIELD OF THE INVENTION

The invention relates to a frictional freewheel clutch which has wedging rollers.

BACKGROUND OF THE INVENTION

U.S. Pat. No. 3,031,053 A, for example, discloses a wedging roller freewheel clutch of generic type. This freewheel clutch is intended in particular for use in a torque converter of a motor vehicle. It comprises an outer race provided with a ramp structure and an inner race having a smooth surface, wedging rollers being guided between these races by means of a cage and each being individually sprung against a wedging ramp of its own by concertina springs. Springs tangentially adjacent to the races are formed in such a way that a wedging roller is held between the ends of these springs.

SUMMARY OF THE INVENTION

The object of the invention is to specify a wedging roller freewheel clutch which can be efficiently manufactured and which is particularly easy to assemble.

According to the invention this object is achieved by a freewheel clutch comprising a number of wedging rollers arranged between two races, an inner race and an outer race, which are arranged concentrically with one another. One of the races has wedging ramps that with the wedging rollers, and each wedging roller is individually sprung against a wedging ramp by means of a repeatedly bent concertina leaf spring. Each leaf spring is held against a web of a cage. A U-shaped portion of the leaf spring grips around the web. Integrally joined to the U-shaped portion is a securing portion running in a tangential direction of the races and limiting the mobility of a wedging roller in a first radial direction. Here the securing portion is joined to a U-base of the U-shaped portion connecting two U-legs. An end portion of a U-leg remote from the U-base is bent off from the U-leg otherwise running in a radial direction, in such a way as to form a second securing portion, which limits the mobility of the wedging roller in the radial direction opposed to the first radial direction, an extension of the end portion facing the U-base impinging on the web in such a way that the leaf spring is held on the web through positive interlock in both radial directions by the U-base on the one hand and by the extension of the end portion on the other hand.

The inventive design of the leaf spring firstly allows it to be located in a precisely defined position on the web of the cage. Secondly the wedging rollers are secured in both radial directions to prevent them falling out, so that the arrangement comprising the cage, spring elements, that is to say leaf springs, and wedging rollers is easy to handle when assembling. The axial, radial and tangential directions specified relate to the axis of rotation of the freewheel clutch.

In a preferred development the extension of the end portion, joined to the second securing portion and resting against the web, protrudes obliquely from the U-leg, forming a window in the U-leg. Here the extension of the end portion is preferably arranged as a straight extension of the second securing portion, projecting into the interior of the U-shaped portion.

The U-leg of the leaf spring comprising the bent-off end portion is preferably arranged centrally between two securing portions, which lie in a common plane and which limit the mobility of the wedging roller in the first radial direction. The wedging roller is thereby secured to prevent it tilting during the assembly process.

In an advantageous development the U-shaped portion including the bent-off end portion is elastic, in such a way that the leaf spring can be snapped on to the web in a radial direction without any plastic deformation. The individual webs of the cage preferably each have a rectangular cross-section. The cage can thereby be manufactured very efficiently, in particular from metal or alternatively from plastic. In a preferred development the leaf springs are made of sheet steel. Also feasible as an alternative material is plastic, particularly in cases where comparatively low mechanical and thermal requirements apply.

BRIEF DESCRIPTION OF THE DRAWINGS

An exemplary embodiment of the invention will be explained in more detail below with reference to a drawing, in which.

DETAILED DESCRIPTION OF THE INVENTION

Figure 1:
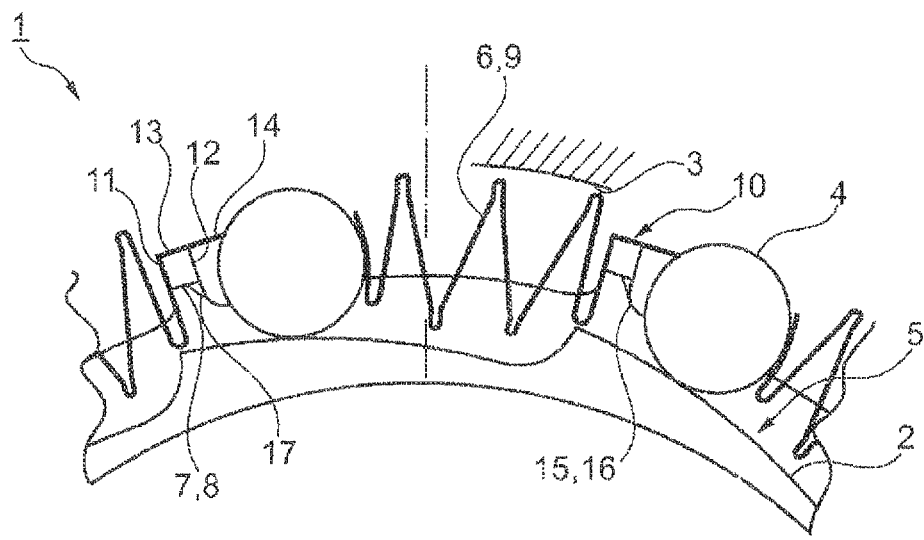
FIG. 1 shows a detail of a freewheel clutch in cross-section.

A freewheel clutch, identified overall by the reference numeral 1, is embodied as a wedging roller freewheel clutch. Reference is made to the state of the art cited in the introductory part and to DE 10 2005 056 220 A1 with regard to the operating principle of the freewheel clutch 1. The freewheel clutch 1 is particularly suitable for an automatic transmission of a motor vehicle and as a stator freewheel in a torque converter, which interacts with such a transmission.

Wedging rollers 4, which interact with wedging ramps 5, which in the exemplary embodiment are formed on the inner race 2, are arranged between an inner race 2 and an outer race 3, merely suggested in FIG. 1. Alternatively the wedging ramps 5 could also be formed on the outer race 3. The component denoted as inner race 2 could also be designed as a solid shaft. In the arrangement according to FIG. 1, with the inner race 2 fixed, the outer race 3 is able to rotate clockwise, whilst a counter-clockwise rotation is blocked.

Figure 2:
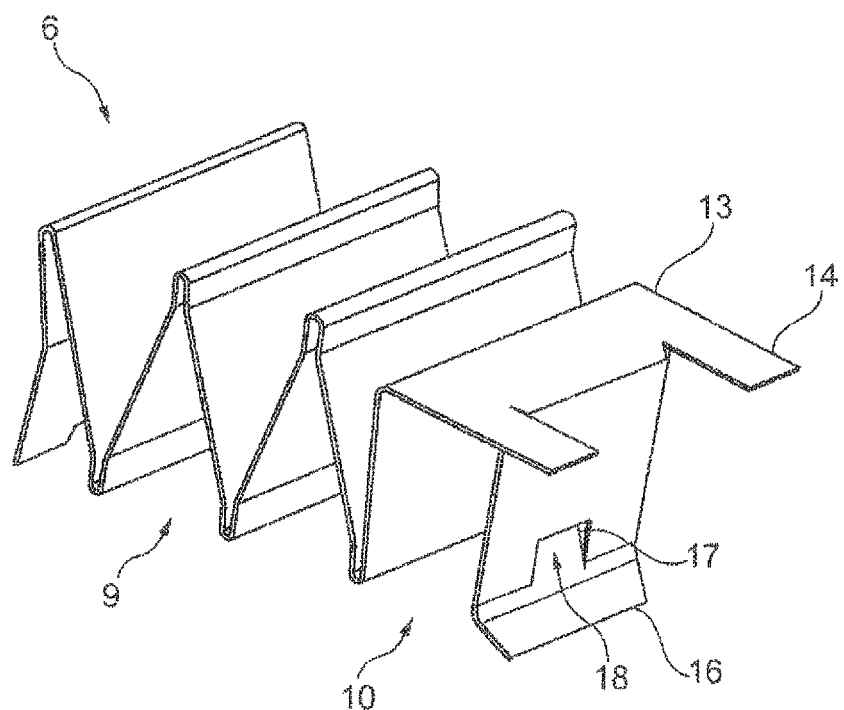
FIG. 2 shows a spring element of the freewheel clutch according to FIG. 1 in the form of a leaf spring.
Figure 3:
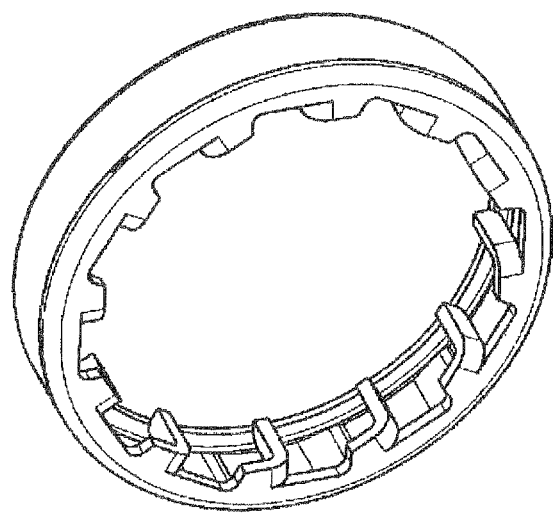
FIG. 3 shows a perspective view of a cage of the freewheel clutch.

In order to hold the wedging rollers 4 permanently blocked in readiness, they are each sprung against a wedging ramp 5 by a spring designed as a leaf spring 6 folded like a concertina. Each leaf spring 6, which is represented in more detail in FIG. 2, is held against a web 7, running in an axial direction of the freewheel clutch 1, of a cage 8, which is shown in more detail in FIG. 3 that is arranged between the inner race 2 and the outer race 3.

The leaf spring 6 is produced as an integral component made from sheet steel and comprises a repeatedly bent-off spring portion 9 exerting a spring force on a wedging roller 4, and a U-shaped portion 10, joined to the spring portion 9 and fixed to a web 7. The U-shaped portion 10 comprises a first U-leg 11, which faces the spring portion 9, a second U-leg 12, and a U-base 13 connecting the two U-legs 11, 12. Whilst the U-base 13 bears on the web 7 on the side thereof facing the outer race 3 and runs in a tangential direction of the races 2, 3, in the cross-section according to FIG. 1, that is to say viewed along the axis of the freewheel clutch 1, the U-legs 11, 12 bear laterally against the web 7.

In a straight extension of the U-base 13 this merges, on the side remote from the spring portion 9, into a securing portion 14, which when the freewheel clutch 1 is not yet finally assembled secures a wedging roller 4 in a radial direction, that is to say outwards, to prevent it falling out of the arrangement comprising the cage 8 and the leaf springs 6.

In contrast to the first U-leg 11, the U-leg 12 joined to the U-base 13 on the side of the securing portion 14 does not run entirely in a radial direction. Instead the second U-leg 12, on its side remote from the U-base 13 and the securing portion 14, comprises an end portion 15, which is set obliquely to the radial direction in such a way that a second securing portion 16 is formed, which like the first securing portion 14 secures the wedging roller 4 inwardly to prevent it from falling out of the arrangement comprising the cage 8 and the leaf springs 6.

The entire U-leg 12 including the end portion 15 comprising the second securing portion 14 is arranged axially—relative to the axis of rotation of the freewheel clutch 1—between two similar securing portions 14 of the first type parallel to one another.

Directly adjoining the second securing portion 16 in the direction of the interior of the U-shaped portion 10, and hence also in the direction of the U-base 13, the end portion 15 comprises an extension 17, which is in contact with the web 7 on its side remote from the U-base 13, that is to say on the side facing the inner race 2, the extension 17 being bent out of the material of the U-leg 12, so that a window 18 is formed in the U-leg 12. Both in a tangential direction and also in a radial direction, the U-shaped portion 10 of the leaf spring 6 is therefore held through positive interlock in a precisely defined position on the web 7 by the U-legs 11, 12, the U-base 13 and the extension 17 of the end portion 15.

LIST OF REFERENCE NUMERALS

1 Freewheel Clutch
2 Inner Race
3 Outer Race
4 Wedging Roller
5 Wedging Ramp
6 Leaf Spring
7 Web
8 Cage
9 Spring Portion
10 U-Shaped Portion
11 First U-Leg
12 Second U-Leg
13 U-Base
14 First Securing Portion
15 End Portion
16 Second Securing Portion
17 Extension
18 Window

The invention claimed is:

1. A freewheel clutch, comprising:
   two races, an inner race and an outer race, arranged concentrically with one another, one of the races having wedging ramps;
   wedging rollers arranged between the two races and interacting with the wedging ramps;
   a cage having a web; and
   a repeatedly bent leaf spring arranged between the two races with each of the wedging rollers being individually sprung against one of the wedging ramps by means of the leaf spring, the leaf spring having a U-shaped portion with a U-base, a securing portion extending from the U-base running in a tangential direction of the races and limiting mobility of the wedging rollers in a first radial direction, and a U-leg, which has an end portion with an extension facing the U-base, extending from the U-base, transverse of the securing portion,
   wherein each leaf spring is held against the web of the cage, gripping around the web with the U-shaped portion, and the end portion of a U-leg forms a second securing portion that limits the mobility of the wedging rollers in a second radial direction, which is opposed to the first radial direction, and the extension of the end portion impinges on the web such that the leaf spring is held on the web through positive interlock in both radial directions by the U-base and by the extension of the end portion.

2. The freewheel clutch as claimed in claim 1, wherein the extension of the end portion, which is joined to the second securing portion, protrudes obliquely from the U-leg, forming a window therein.

3. The freewheel clutch as claimed in claim 2, wherein the extension, which is in contact with the web, is arranged as a straight extension of the second securing portion, projecting into an interior of the U-shaped portion.

4. The freewheel clutch as claimed in claim 1, wherein the U-leg is arranged between two securing portions, which limit the mobility of the wedging roller in the first radial direction.

5. The freewheel clutch as claimed in claim 1, wherein the U-shaped portion, including the bent-off end portion, is elastic, such that the leaf spring can be snapped on to the web in a radial direction.

6. The freewheel clutch as claimed in claim 1, wherein the web has a rectangular cross-section.

7. The freewheel clutch as claimed in claim 1, wherein the leaf spring is made of sheet steel.

* * * * *